(12) United States Patent
Watamura et al.

(10) Patent No.: US 10,228,722 B2
(45) Date of Patent: Mar. 12, 2019

(54) PORTABLE INFORMATION DEVICE

(71) Applicant: LENOVO (SINGAPORE) PTE. LTD., Singapore (SG)

(72) Inventors: Kenji Watamura, Yokohama (JP);
Seita Horikoshi, Yokohama (JP);
Masayuki Amano, Yokohama (JP);
Takehito Yamauchi, Yokohama (JP);
Moriyuki Tsuchihashi, Yokohama (JP);
Kazuo Fujii, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/855,634

(22) Filed: Dec. 27, 2017

(65) Prior Publication Data
US 2018/0196467 A1 Jul. 12, 2018

(30) Foreign Application Priority Data

Jan. 10, 2017 (JP) .................................. 2017-002062

(51) Int. Cl.
*G06F 1/16* (2006.01)

(52) U.S. Cl.
CPC .................................. *G06F 1/1616* (2013.01)

(58) Field of Classification Search
CPC ..... G06F 1/1641; G06F 1/1647; G06F 1/1652
See application file for complete search history.

(56) References Cited

U.S. PATENT DOCUMENTS

| | | | | |
|---|---|---|---|---|
| 2013/0021762 A1* | 1/2013 | van Dijk | ............... | G06F 1/1652 361/749 |
| 2013/0314611 A1* | 11/2013 | Okutsu | .................... | H04N 5/64 348/739 |
| 2015/0241925 A1* | 8/2015 | Seo | ........................ | G06F 1/1652 361/679.27 |
| 2015/0366089 A1* | 12/2015 | Park | ....................... | G06F 1/1641 361/679.01 |
| 2016/0062412 A1* | 3/2016 | Park | ....................... | G06F 1/1616 361/679.27 |
| 2016/0085265 A1* | 3/2016 | Park | ....................... | G06F 1/1681 361/807 |
| 2017/0228002 A1* | 8/2017 | Yamazaki | ............... | G06F 1/263 |

FOREIGN PATENT DOCUMENTS

| | | |
|---|---|---|
| JP | 2005114759 A | 4/2005 |
| JP | 2007335622 A | 12/2007 |
| JP | 2010278616 A | 12/2010 |
| JP | 2014216025 A | 11/2014 |
| JP | 2015064570 A | 4/2015 |
| WO | 2005086607 A2 | 9/2005 |
| WO | 2016080239 A1 | 5/2016 |

\* cited by examiner

*Primary Examiner* — Anthony Q Edwards
(74) *Attorney, Agent, or Firm* — Shimokaji IP

(57) ABSTRACT

A portable information device is capable of stably supporting a foldable display. The portable information device has a support plate which is fixed to the inner surface sides of a first chassis member and a second chassis member and supports the rear surface of a display. The support plate has a first plate member disposed on the inner surface side of the first chassis member, a second plate member disposed on the inner surface side of the second chassis member, and a flexible sheet-like member connecting the first plate member and the second plate member so as to be foldable into a double-folded state.

12 Claims, 11 Drawing Sheets

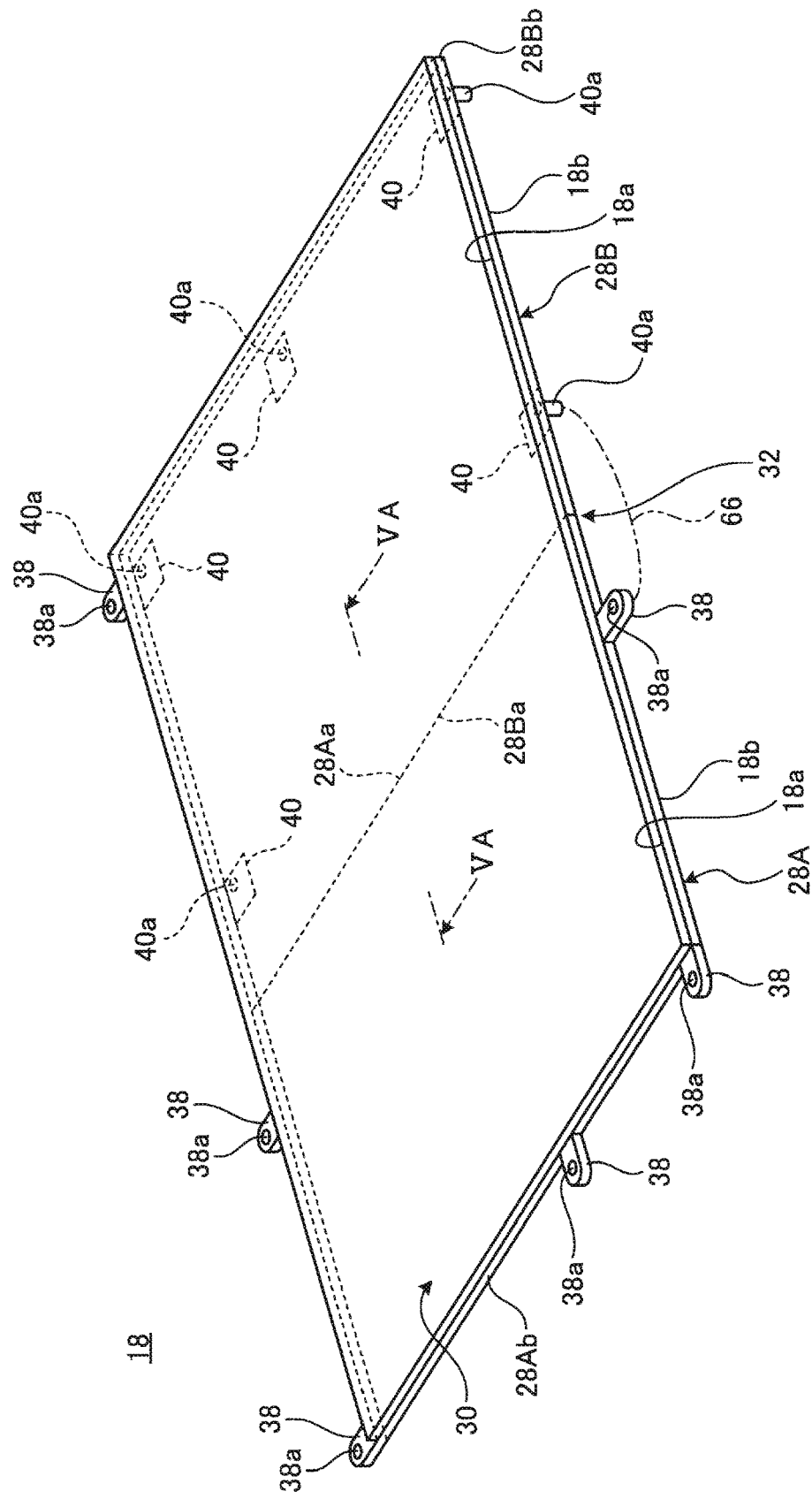

PORTABLE INFORMATION DEVICE

FIELD OF THE INVENTION

The present invention relates to a portable information device in which a foldable display is provided inside a pair of foldable chassis members.

BACKGROUND OF THE INVENTION

In recent years, portable information devices, such as a tablet PC and a smartphone having a touch panel type liquid crystal display and not having a physical keyboard, have rapidly spread. The display of this kind of portable information device has been desired to be large in use but has been desired to be miniaturized in carrying. Then, a portable information device has been proposed in which not only a chassis but a display is configured so as to be foldable by the use of a flexible display, such as organic EL (Electro Luminescence) (for example, see Patent Document 1).

[Patent Document 1] Japanese Patent Application Laid-Open No. 2014-216025

SUMMARY OF THE INVENTION

The flexible display described above is very thin and vulnerable to impact or the like. Therefore, the display needs to be stably supported on the inner surface side of the chassis member which is movable to be double-folded.

The present invention has been made considering the above-described problems of the former technique. It is an object of the present invention to provide a portable information device capable of stably supporting a foldable display.

A portable information device according to the present invention has a first chassis member, a second chassis member foldably connected with the first chassis member, a display which is provided over the inner surfaces of the first chassis member and the second chassis member and which is foldable into a double-folded state, and a support plate which is fixed to the inner surface sides of the first chassis member and the second chassis member and supports the rear surface of the display, in which the support plate has a first plate member disposed on the inner surface side of the first chassis member, a second plate member disposed on the inner surface side of the second chassis member, and a flexible sheet-like member connecting the first plate member and the second plate member so as to be foldable into a double-folded state.

The flexible sheet-like member may be configured so as to be provided on the entire surfaces of the first plate member and the second plate member, and may be configured so that the display is fixed to the surface thereof.

A configuration may be acceptable in which, while a gap is formed between one end surface of the first plate member and one end surface of the second plate member facing the one end surface of the first plate member, in a state where the first chassis member and the second chassis member are folded into a double-folded state, a gap is not formed in a state where the first chassis member and the second chassis member are opened into a flat plate shape.

A configuration may be acceptable in which the first plate member and the second plate member are formed of a fiber reinforced resin plate and the flexible sheet-like member is formed of metallic foil.

A configuration may be acceptable in which at least one of the first plate member and the second plate member has an attachment piece projecting outwardly from a part of the outer peripheral end surface and is fixed to the first chassis member or the second chassis member through the attachment piece.

A configuration may be acceptable in which at least one of the first plate member and the second plate member has an attachment portion projecting from the rear surface of an outer peripheral edge portion thereof and is fixed to the first chassis member or the second chassis member through the attachment portion.

A configuration may be acceptable in which a cushion member is placed between the rear surface of the support plate and the inner surface of at least one of the first chassis member and the second chassis member.

A configuration may be acceptable in which a damping member is provided on the rear surface side of the support plate.

A configuration may be acceptable in which, while a main substrate on which an arithmetic unit is mounted is provided on the inner surface of the first chassis member, a sub-substrate controlling the display state of the display is provided on the inner surface of the second chassis member, the main substrate and the sub-substrate are electrically connected by a main wiring line crossing the first chassis member and the second chassis member, and the display is electrically connected with the sub-substrate by a sub-wiring line drawn out from a portion located on the inner surface side of the second chassis member.

A configuration may be acceptable in which the first chassis member and the second chassis member are electrically connected, one end portion of the display and the second chassis member are electrically connected, and the other end portion opposite to the one end portion of the display and the first chassis member are electrically connected.

A configuration may be acceptable in which, while the first chassis member is electrically connected with the first plate member, the second chassis member is electrically connected with the second plate member, and the portable information device has a first conductive member electrically connecting the first chassis member and the second chassis member by electrically connecting the first plate member and the second plate member, and a second conductive member electrically connecting the other end portion of the display and the first chassis member by electrically connecting the other end portion of the display and the first plate member.

A portable information device according to the present invention has a first chassis member, a second chassis member foldably connected with the first chassis member, a display which is provided over the inner surfaces of the first chassis member and the second chassis member and which is foldable into a double-folded state, a main substrate on which an arithmetic unit is mounted is provided on the inner surface of the first chassis member, and a sub-substrate controlling the display state of the display is provided on the inner surface of the second chassis member, in which the main substrate and the sub-substrate are electrically connected by a main wiring line crossing the first chassis member and the second chassis member, and the display is electrically connected with the sub-substrate by a sub-wiring line drawn out from a portion located on the inner surface side of the second chassis member.

A portable information device according to the present invention has a first chassis member, a second chassis member foldably connected with the first chassis member, a rectangular display which is provided over the inner surfaces of the first chassis member and the second chassis member and which is foldable into a double-folded state, in which the first chassis member and the second chassis member are electrically connected, one end portion of the display and the second chassis member are electrically connected, and the other end portion opposite to the one end portion of the display is electrically connected with the first chassis member.

According to the present invention, the foldable display can be stably supported by the support plate on the inner surface sides of the foldable chassis members.

BRIEF DESCRIPTION OF THE DRAWINGS

FIG. 4 is a perspective view schematically illustrating the configuration of a support plate.

DETAILED DESCRIPTION OF THE INVENTION

Hereinafter, a preferable embodiment of a portable information device according to the present invention is described in detail with reference to the attached drawings.

1. Description of Entire Configuration of Portable Information Device

Figure 1:
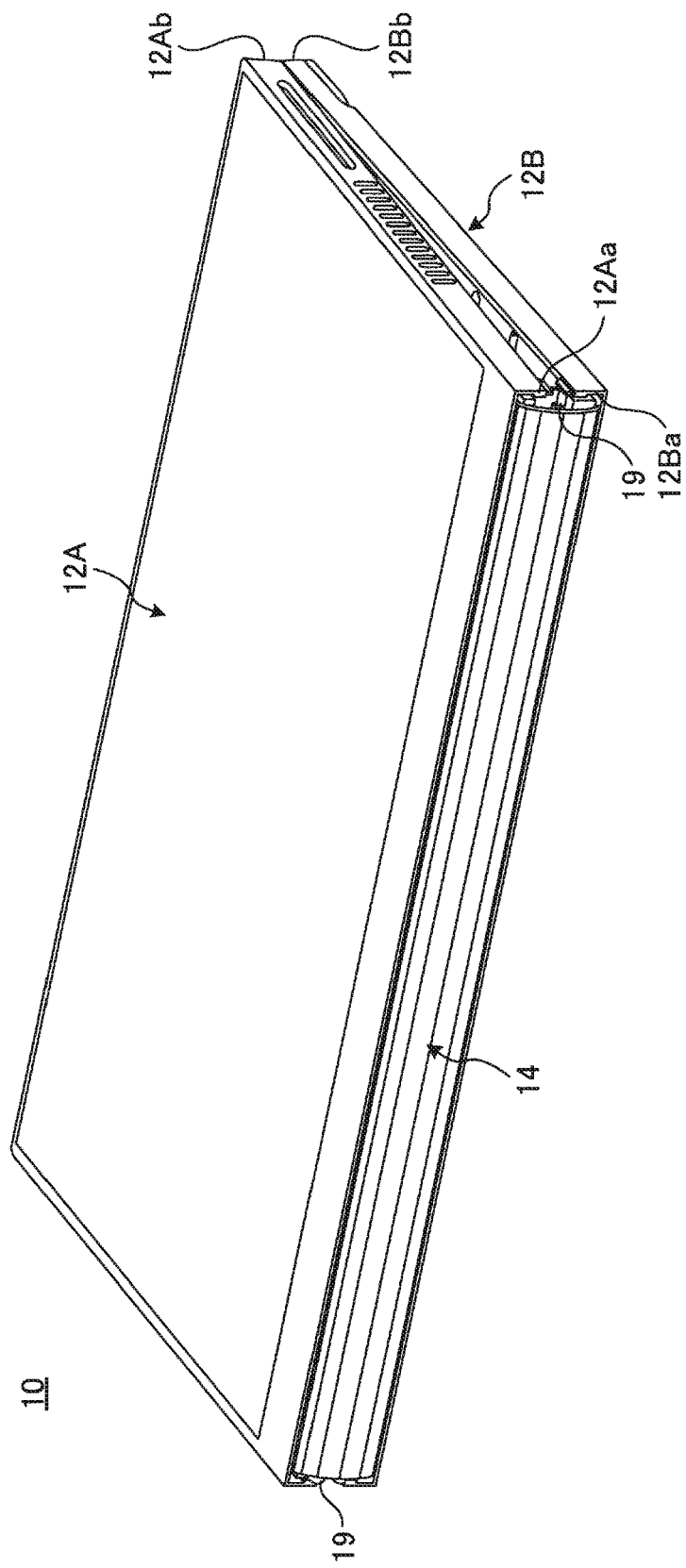
FIG. 1 is a perspective view illustrating a state where a portable information device according to one embodiment of the present invention is closed into a storage form.
Figure 2:
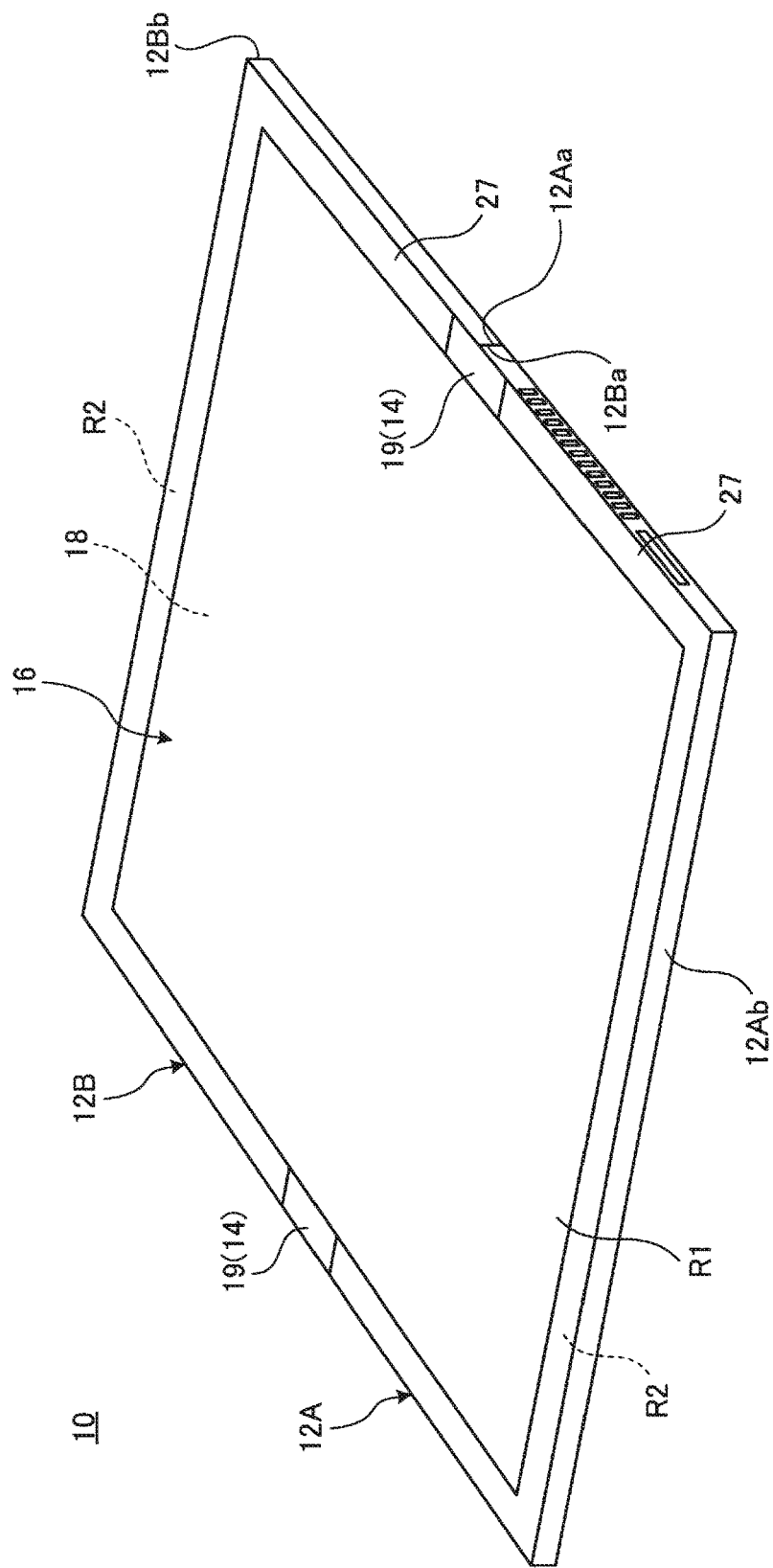
FIG. 2 is a perspective view schematically illustrating a state where the portable information device illustrated in FIG. 1 is opened into a usage form.
Figure 3:
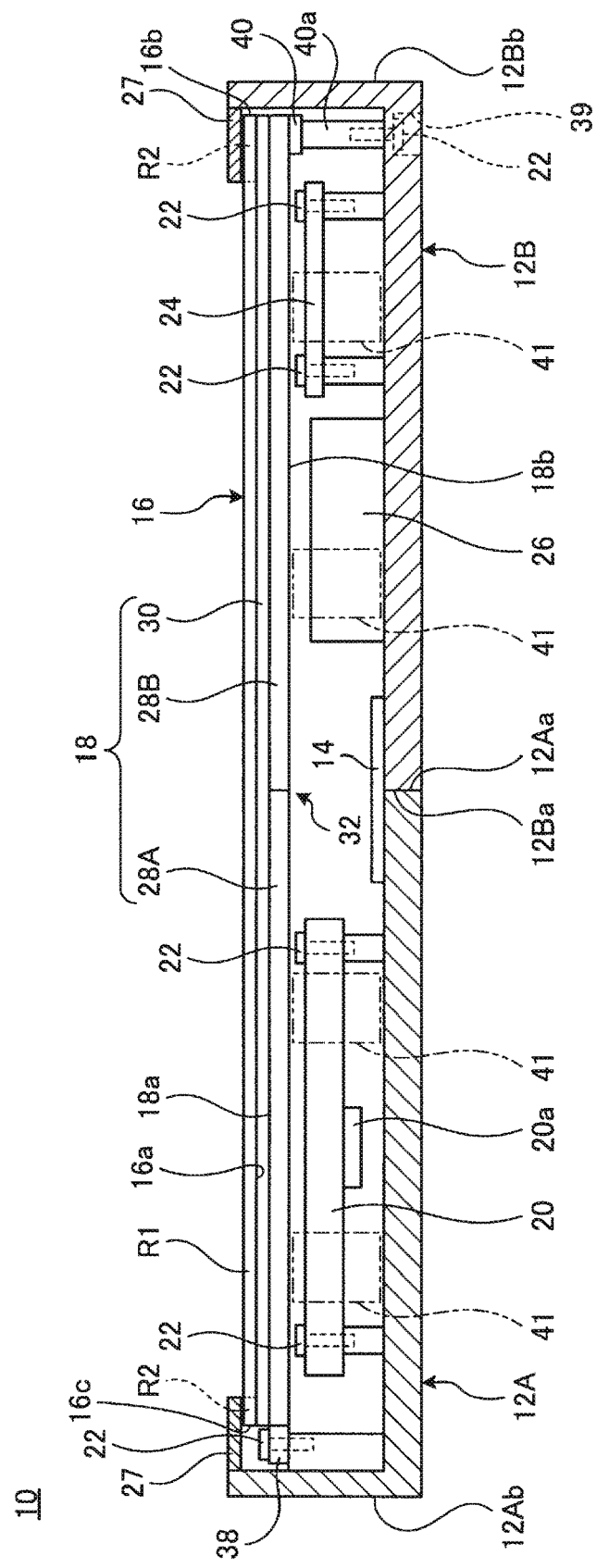
FIG. 3 is a side cross-sectional view of the portable information device illustrated in FIG. 2.

FIG. 1 is a perspective view illustrating a state where a portable information device 10 according to one embodiment of the present invention is closed into a storage form. FIG. 2 is a perspective view schematically illustrating a state where the portable information device 10 illustrated in FIG. 1 is opened into a usage form. FIG. 3 is a side cross-sectional view of the portable information device 10 illustrated in FIG. 2.

As illustrated in FIG. 1 and FIG. 2, the portable information device 10 has a first chassis member 12A, a second chassis member 12B, a backbone portion 14, and a display 16. This embodiment describes a tablet PC which is foldable into a double-folded state like a book as an example of the portable information device 10. The portable information device 10 may be a cellular phone, a smartphone, an electronic notebook, or the like.

The chassis members 12A and 12B each are rectangular plate-like members in which the side walls are formed so as to be raised on three sides other than the side corresponding to the backbone portion 14. The chassis members 12A and 12B each contain metal plates of stainless steel, magnesium, and aluminum, fiber reinforced resin plates containing reinforced fibers, such as carbon fibers, and the like, for example. To the inner surface sides of the chassis members 12A and 12B, a display 16 is fixed through a support plate 18 (see FIG. 3). The chassis members 12A and 12B are connected through a pair of hinge mechanisms 19 and 19 provided on both end portions of the backbone portion 14. The hinge mechanisms 19 connect the chassis members 12A and 12B so as to be foldable into the storage form illustrated in FIG. 1 and the usage form illustrated in FIG. 2.

In the chassis members 12A and 12B, inner end surfaces 12Aa and 12Ba on the backbone portion 14 side serve as hinge sides, and outer end surfaces 12Ab and 12Bb on the side opposite to the backbone portion 14 serve as open end portion sides.

As illustrated in FIG. 3, a main substrate 20 is fixed to the inner surface of the first chassis member 12A using conductive screws 22. The main substrate 20 is an electronic substrate for performing the overall control of the portable information device 10. On the main substrate 20, various kinds of electronic components, such as a central processing unit (CPU) 20a and a memory which are not illustrated, are mounted. The conductive screw 22 is a screw formed of metal, resin, and the like having conductivity.

A sub-substrate 24 is fixed to the inner surface of the second chassis member 12B using the conductive screws 22. The sub-substrate 24 is an electronic substrate functioning as a controller controlling the display state of the display 16. A battery device 26 is fixed to the inner surface of the second chassis member 12B in parallel to the sub-substrate 24. The battery device 26 is a power source of the portable information device 10 and can be charged from an external power source through a power cable which is not illustrated.

The backbone portion 14 is a thin plate-like member having flexibility serving as the backbone in folding the portable information device 10 as illustrated in FIG. 1. In the case of this embodiment, the backbone portion 14 is provided throughout between the chassis members 12A and 12B so as to cover the inner end surfaces 12Aa and 12Ba from the inner side. The backbone portion 14 is slidable along the direction in which the chassis members 12A and 12B are arranged on the inner surfaces of the chassis members 12A and 12B. In the usage form illustrated in FIG. 3, the backbone portion 14 is disposed in a flat plate shape along the inner surfaces of the chassis members 12A and 12B, the inner end surfaces 12Aa and 12Ba of which are caused to abut on each other. In the storage form illustrated in FIG. 1, the backbone portion 14 is disposed in an arc shape so as to cover the gap between the inner end surfaces 12Aa and 12Ba of the chassis members 12A and 12B which are separated from each other.

The display 16 is a touch panel type liquid crystal display, for example. The display 16 is configured so as to be foldable together with the chassis members 12A and 12B when the chassis members 12A and 12B are folded. The display 16 is a flexible display, such as an organic EL having a paper structure with high flexibility, for example and is opened/closed with an opening/closing operation of the chassis members 12A and 12B. The display 16 is attached and fixed to the inner surface sides of the chassis members 12A and 12B through the support plate 18. A rear surface 16a of the display surface (front surface) of the display 16 is pasted and fixed to a surface 18a of the support plate 18 using an adhesive or the like.

As illustrated in FIG. 2 and FIG. 3, a bezel member 27 is disposed on an outer peripheral edge portion of the surface of the display 16 in the state of being attached and fixed to the inner surface sides of the chassis members 12A and 12B through the support plate 18. The bezel member 27 is provided so as to cover a non-displaying region (inactive region) R2 of the outer peripheral edge portion excluding a display region (active region) R1 of the surface of the display 16.

2. Description of Support Plate

The support plate 18 is described. The display 16 is very thin, and therefore, when fixed alone to the chassis members 12A and 12B, the display 16 has a concern of causing a breakage or a defect. Then, in the portable information device 10, an assembly component in which the support plate 18 is stuck to the rear surface 16a of the display 16 is attached and fixed to the chassis members 12A and 12B.

Figure 5A:
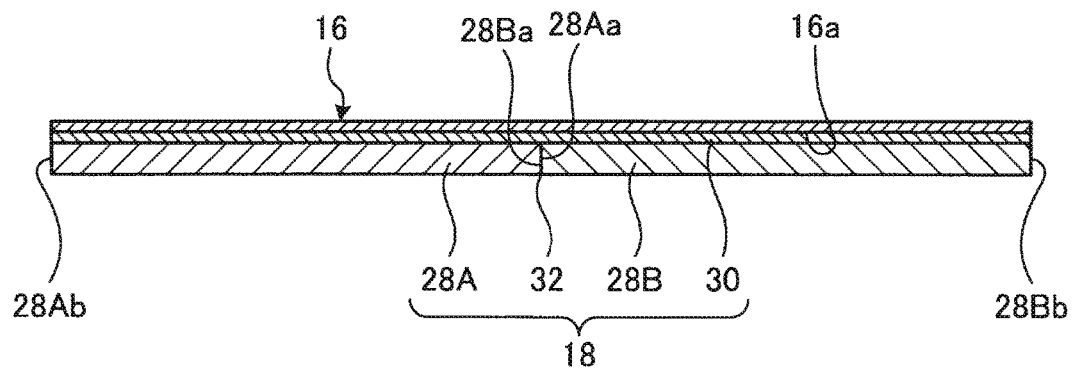
FIG. 5A is a cross-sectional view along the VA-VA line in FIG. 4.
Figure 5B:
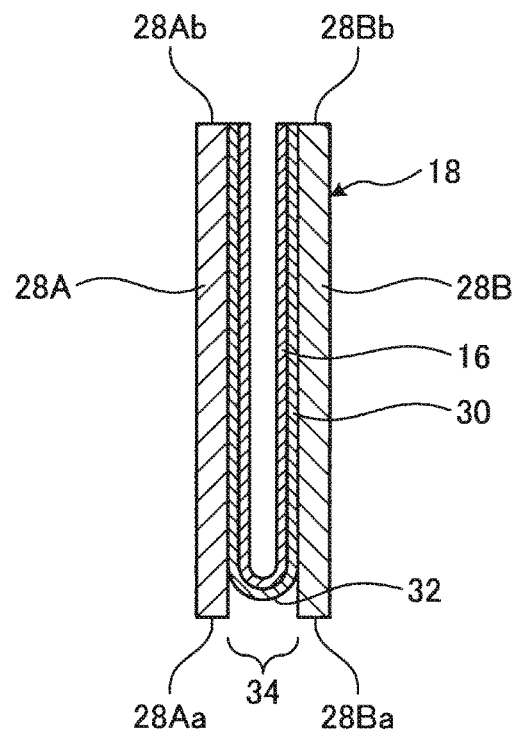
FIG. 5B is a side cross-sectional view illustrating a state where the support plate illustrated in FIG. 5A is folded into a double-folded state.

FIG. 4 is a perspective view schematically illustrating the configuration of the support plate 18. FIG. 5A is a cross-sectional view along the VA-VA line in FIG. 4. FIG. 5B is a side cross-sectional view illustrating a state where the support plate 18 illustrated in FIG. 5A is folded into a double-folded state.

As illustrated in FIG. 4 to FIG. 5B, the support plate 18 has a first plate member 28A, a second plate member 28B, and a sheet-like member (flexible sheet-like member) 30.

The first plate member 28A is a rectangular plate-like member to be disposed on the inner surface side of the first chassis member 12A. The outer shape, as viewed in plane of the first plate member 28A, is slightly smaller than the first chassis member 12A (see FIG. 3). The second plate member 28B is a rectangular plate-like member to be disposed on the inner surface side of the second chassis member 12B. The outer shape, as viewed in plane of the second plate member 28B, is slightly smaller than the second chassis member 12B (see FIG. 3). The support plates 28A and 28B contain metal plates of stainless steel, magnesium, and aluminum, fiber reinforced resin plates in which a matrix resin containing a thermosetting resin or a thermoplastic resin is impregnated with reinforced fibers, such as carbon fibers, and the like, for example. In this embodiment, a carbon fiber reinforced resin plate containing carbon fibers as a reinforced resin is used.

The first plate member 28A and the second plate member 28B are connected so as to be foldable into a double-folded state by the sheet-like member 30 stuck to the entire surfaces 18a and 18a thereof. In the plate members 28A and 28B, inner end surfaces (one end surface) 28Aa and 28Ba facing each other serve as the hinge sides, and the outer end surfaces (other end surface) 28Ab and 28Bb opposite to the hinge side serve as the open end portion sides.

The sheet-like member 30 is a thin film containing a material having flexibility, such as a thin resin film or metallic foil. The sheet-like member 30 is stuck to the entire surfaces 18a of the plate members 28A and 28B. In this embodiment, a metallic foil containing stainless steel is used as the sheet-like member 30. The sheet-like member 30 is bonded to the surfaces 18a of the plate members 28A and 28B using an adhesive or the like. The display 16 is stuck to the surface of the sheet-like member 30 using an adhesive, a double-sided tape, or the like. In the sheet-like member 30, a portion covering the inner end surfaces 28Aa and 28Ba which are adjacent end portions of the plate members 28A and 28B functions as a bending portion (flexible hinge) 32 of the support plate 18.

In the bending portion 32, the inner end surface 28Aa of the first plate member 28A and the inner end surface 28Ba of the second plate member 28B abut on each other in the usage form in which the chassis members 12A and 12B are opened into a flat plate shape (see FIG. 5A). More specifically, no gap is formed between the inner end surfaces 28Aa and 28Ba. Therefore, the support plate 18 can support the entire region of the rear surface 16a of the display 16 in the usage form with the hard plate members 28A and 28B. As a result, the impact resistance of the display 16 is improved.

On the other hand, in the storage form in which the chassis members 12A and 12B are folded, the inner end surfaces 28Aa and 28Ba are separated from each other, so that a gap 34 is formed (see FIG. 5B). Therefore, in the sheet-like member 30, a portion (portion exposed to the gap 34 in FIG. 5B) corresponding to the bending portion 32 is not bonded to the plate members 28A and 28B.

As illustrated in FIG. 4, in the first plate member 28A, one or two or more of attachment pieces 38 each are formed so as to project on the outer peripheral end surfaces of the three sides other than the inner end surface 28Aa. The attachment piece 38 is a projection piece having an arc-shaped tip and having a plate thickness which is the same as or slightly smaller than the plate thickness of the first plate member 28A. In the attachment piece 38, an attachment hole 38a penetrating in the plate thickness direction is formed. In the second plate member 28B, one or two or more of attachment portions 40 each are fixed to the rear surface 18b of outer peripheral end portions of three sides other than the inner end surface 28Ba. The attachment portion 40 is a boss member in which a cylindrical pin 40a is protrusively provided in the undersurface of a rectangular thin substrate. In the pin 40a, a female screw opened in the top end surface is formed in the axial direction. In each of the attachment portions 40, the upper surface of the thin substrate is stuck to the rear surface 18b of the second plate member 28B using an adhesive, a double-sided tape, or the like. The second plate member 28B is also provided with the attachment piece 38 on one of the outer peripheral end surfaces. The attachment portion 40 may also be provided in the first plate member 28A.

Figure 6:
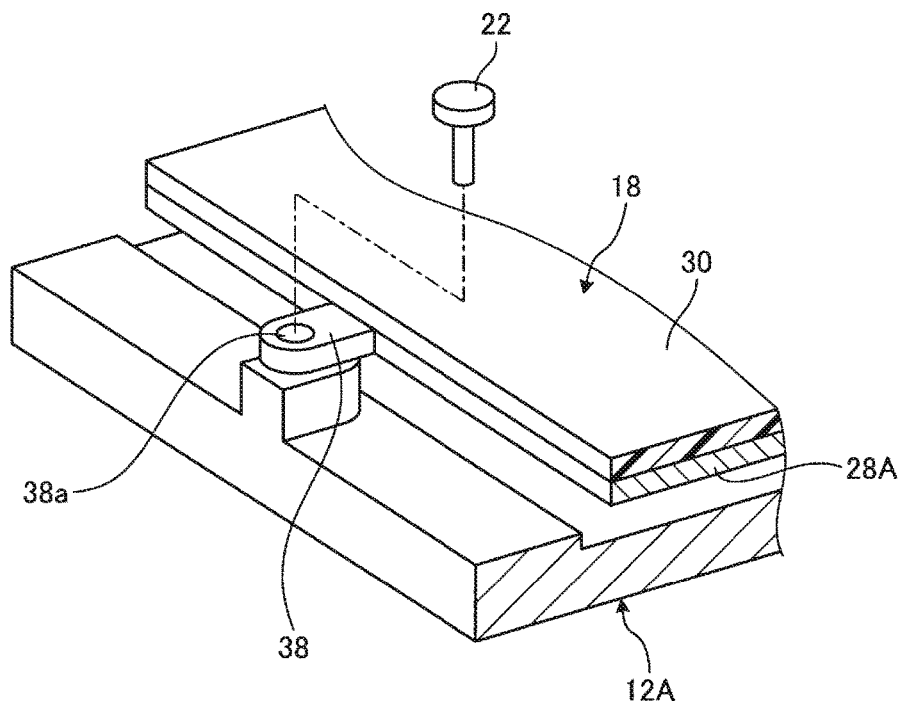
FIG. 6 is a perspective view schematically illustrating the fixing structure to a chassis member of the support plate using an attachment piece.
Figure 7:
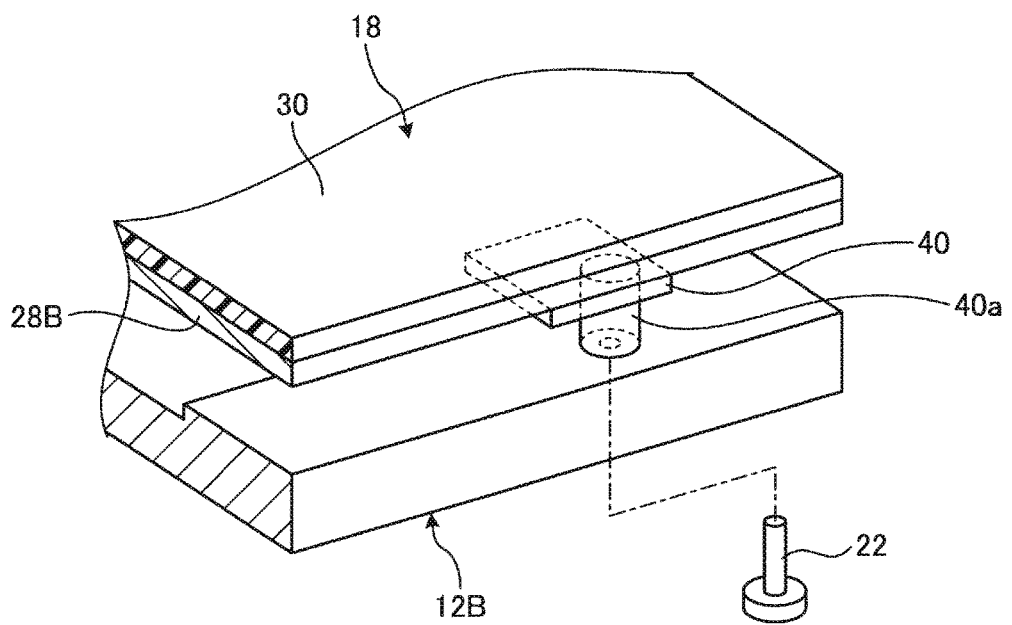
FIG. 7 is a perspective view schematically illustrating the fixing structure to the chassis member of the support plate using an attachment portion.

FIG. 6 is a perspective view schematically illustrating the fixing structure to the chassis members 12A and 12B of the support plate 18 using the attachment piece 38. FIG. 7 is a perspective view schematically illustrating the fixing structure to the chassis members 12A and 12B of the support plate 18 using the attachment portion 40.

As illustrated in FIG. 3 and FIG. 6, each attachment piece 38 is attached and fixed to the first plate member 28A through the conductive screw 22 to be inserted into the attachment hole 38a. As illustrated in FIG. 3 and FIG. 7, each attachment portion 40 is attached and fixed to the second plate member 28B through the conductive screw 22 to be inserted into a countersunk hole portion 39 formed in the outer surface of the second plate member 28B.

By the use of the attachment pieces 38 and the attachment portions 40, the support plate 18 (display 16) is attached and fixed in a support state like a trampoline in which the outer peripheral edge portion thereof is held on the inner surface sides of the chassis members 12A and 12B. Thus, the support plate 18 is supported with a cushion structure in upper portions of the chassis members 12A and 12B. In the case of this embodiment, since the display 16 is a thin flexible display and the surface cannot be protected with a hard glass plate or the like, the display 16 also has a problem of low impact resistance. Then, by supporting the support plate 18 with the cushion structure, impact or a load caused by a substance falling on the display 16 or falling of the portable information device 10 can be absorbed.

As illustrated in FIG. 3, cushion members 41 may be provided between the rear surface 18b of the support plate 18 and the inner surfaces of the chassis members 12A and 12B. By providing the cushion members 41, a portion around a central portion of the support plate 18 (display 16), only the outer peripheral edge portion of which is supported, can be supported without impairing the impact resistance. The cushion member 41 is a flexible member formed of a silicone-based gel material, a foamed rubber, or the like, for example. In this embodiment, Alpha GEL (®) which is the silicone-based gel material is used as the cushion members 41.

3. Description of Modification of Impact Absorbing Structure to Display

Figure 8:
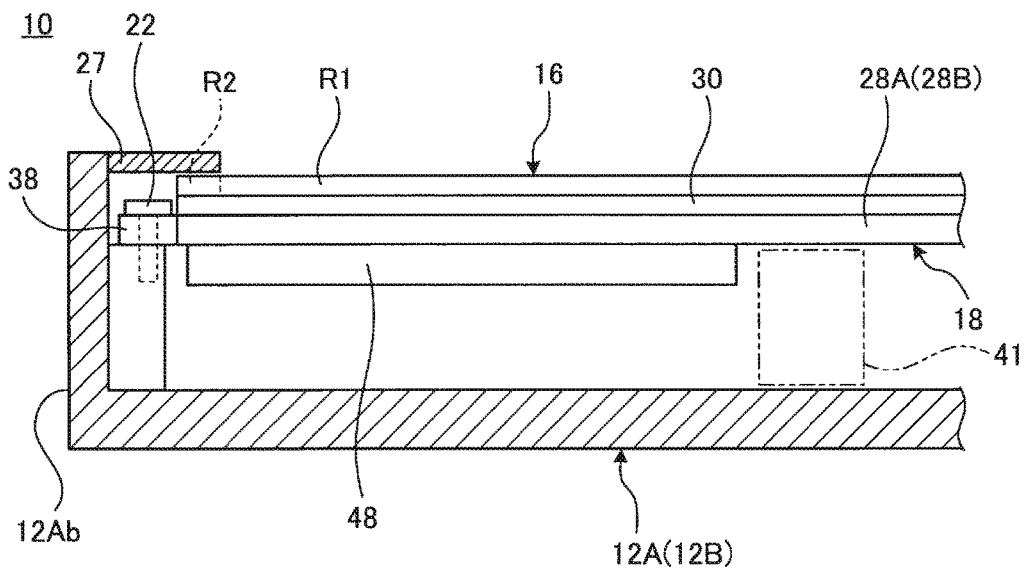
FIG. 8 is an enlarged side cross-sectional view of a principal portion illustrating an example of the configuration of providing a damping sheet as a damping member.
Figure 9:
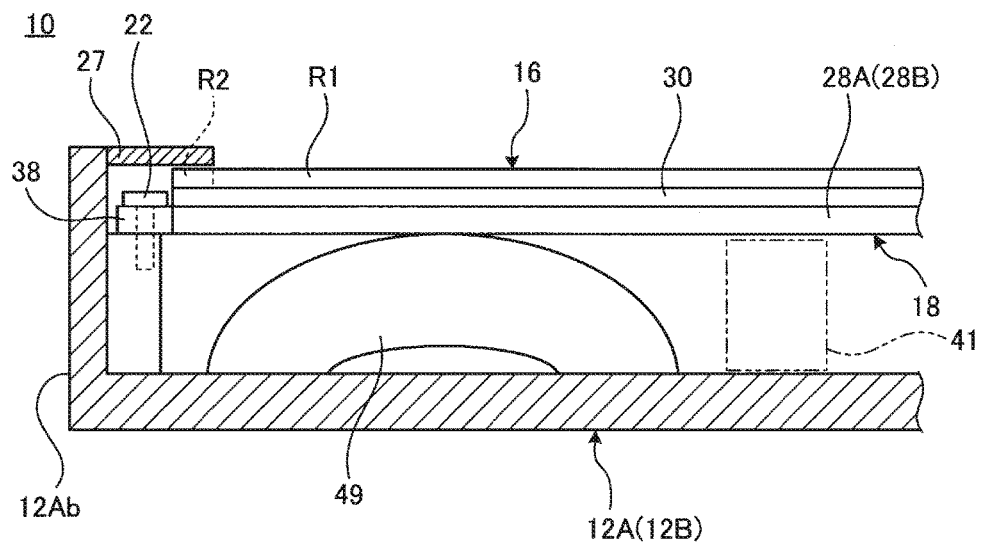
FIG. 9 is an enlarged side cross-sectional view of a principal portion illustrating an example of the configuration of providing a damping spring as a damping member.

As described above, the display 16 is vulnerable to impact, and therefore, a structure for absorbing the impact may be provided. FIG. 8 is an enlarged side cross-sectional view of a principal portion illustrating an example of the configuration of providing a damping sheet 48 as a damping member. FIG. 9 is an enlarged side cross-sectional view of a principal portion illustrating an example of the configuration of providing a damping spring 49 as a damping member.

As illustrated in FIG. 8, the damping sheet 48 is stuck to the rear surface 18b of the support plate 18 using an adhesive, a double-sided tape, or the like. The damping sheet 48 is a sheet containing a material which hardly repulses external force when received and can absorb impact or vibration, for example. In this embodiment, Hanenaito (®) and VBRAN (®) which are rubber-based damping materials are used as the damping sheet 48. By providing the damping sheet 48 on the rear surface 18b of the support plate 18, impact or vibration applied to the surface of the display 16 is absorbed by the damping sheet 48, so that the impact resistance of the display 16 can be improved.

As illustrated in FIG. 9, the damping spring 49 is a spring member obtained by forming a plate spring member with a predetermined width into an arch shape, for example. In the damping spring 49, leg portions are landed and fixed to the inner surfaces of the chassis members 12A and 12B, and a top portion is caused to abut on or disposed near the rear surface 18b of the support plate 18. By placing the damping spring 49 between the support plate 18 and the chassis members 12A and 12B, impact or vibration applied to the surface of the display 16 is absorbed, so that the impact resistance of the display 16 can be improved. The damping spring 49 may not have the arch shape and may contain a damper, a coil spring, and the like.

4. Description of Wiring Line Structure and Wiring Method

The wiring line structure and a wiring method of the portable information device 10 are described. The portable information device 10 adopts the configuration in which the portable information device 10 is foldable into a double-folded state. Therefore, an electronic substrate or electronic components are disposed as appropriate on the inner surfaces of the chassis members 12A and 12B on the right side and the left side, and wiring lines connecting the same need to be provided crossing the backbone portion 14 to be bent. Moreover, the electronic substrate and the wiring lines are hidden on the rear surface side of the display 16, and therefore it is preferable to appropriately build the attachment structure of the display 16 and the wiring line structure and a wiring method thereof.

4.1 Description of Wiring Structure

Figure 10:
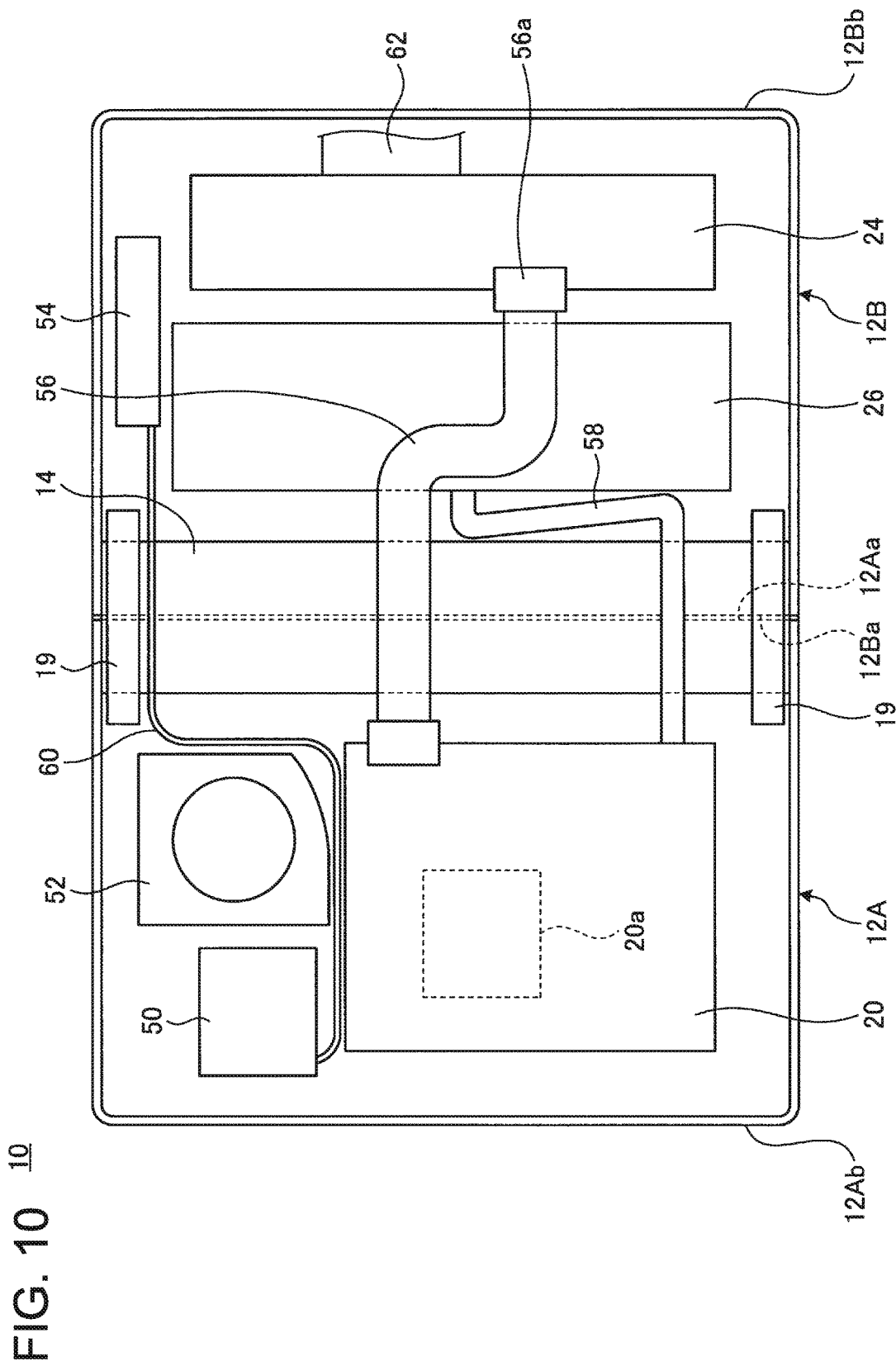
FIG. 10 is a block diagram schematically illustrating a main wiring line structure of the portable information device.

First, the wiring line structure is described. FIG. 10 is a block diagram schematically illustrating a main wiring line structure of the portable information device 10 and illustrates the inner surface sides of the chassis members 12A and 12B brought into the usage form in plan view in which the display 16 is omitted.

As illustrated in FIG. 10, the main substrate 20, a communication module 50, a cooling fan 52, and the like are attached and fixed to the inner surface of the first chassis member 12A. The communication module 50 is a device performing information processing of various wireless communications of wireless LAN (Local Area Network) and the like performing transmission and receiving with an antenna 54. The cooling fan 52 is a fan for cooling heat generated in the central processing unit 20a and the like mounted on the main substrate 20. To the inner surface of the second chassis member 12B, the sub-substrate 24, the battery device 26, the antenna 54, and the like are attached and fixed.

The main substrate 20 and the sub-substrate 24 are electrically connected by a main wiring line 56 crossing the backbone portion 14. The main substrate 20 and the battery device 26 are electrically connected by a battery wiring line 58 crossing the backbone portion 14. The main wiring line 56 and the battery wiring line 58 contain a plurality of wiring line bundles, a flexible substrate, and the like, for example. The communication module 50 and the antenna 54 are electrically connected by a wiring line 60 crossing the backbone portion 14. The portable information device 10 has a plurality of wiring lines, which are not illustrated, crossing the backbone portion 14 besides the wiring lines described above.

The sub-substrate 24 is electrically connected with the display 16 by a sub-wiring line 62. The sub-wiring line 62 contains a plurality of wiring line bundles, a flexible substrate, and the like, for example. The sub-wiring line 62 connects the sub-substrate 24 disposed on the second chassis member 12B and one end portion 16b in the longitudinal direction of the display 16 is disposed on the second chassis member 12B side (see also FIG. 11B). More specifically, the sub-wiring line 62 does not cross the backbone portion 14.

4.2 Description of Wiring Method

Figure 11A:
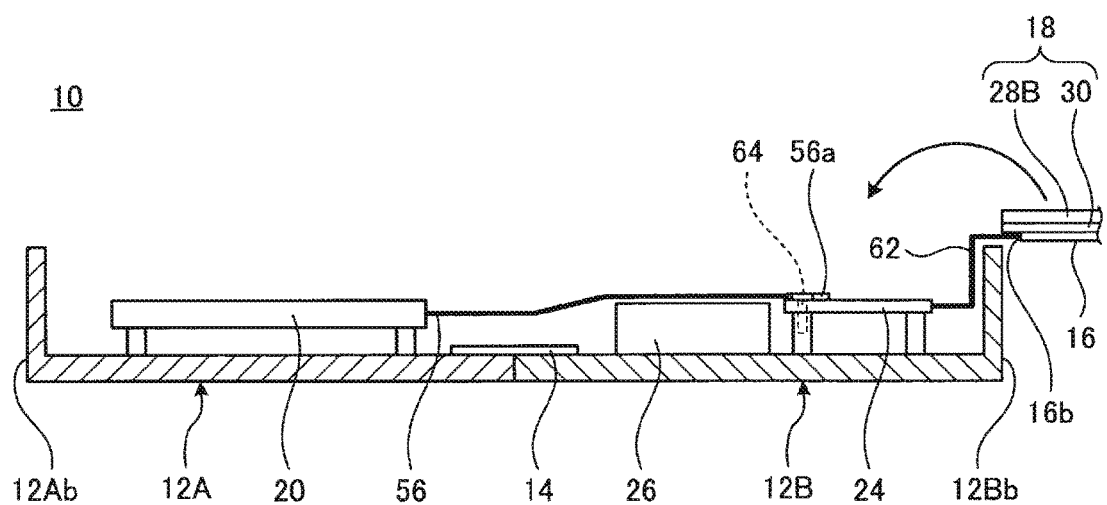
FIG. 11A is a side cross-sectional view schematically illustrating a state where the display is disposed outside in a reversed state and the main wiring line is connected.
Figure 11B:
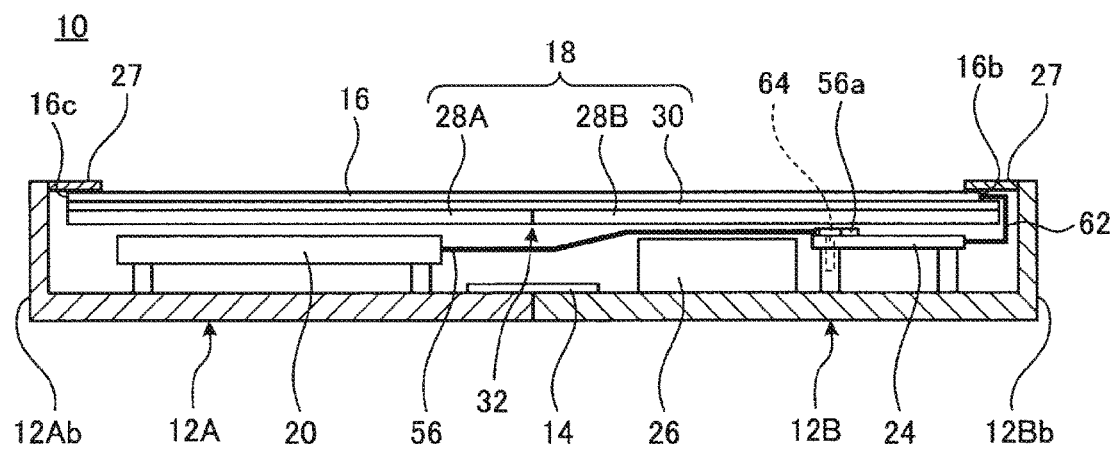
FIG. 11B is a side cross-sectional view schematically illustrating a state where the display is attached and fixed to the inner surface side of the chassis member from the state illustrated in FIG. 11A.

Next, a wiring method is described. The wiring method is a method including first connecting the main wiring line 56 and the like to be hidden by the display 16, and then turning back the wiring by the sub-wiring line 62 to thereby dispose the display 16. FIG. 11A is a side cross-sectional view schematically illustrating a state where the display 16 is disposed outside in a reversed state and the main wiring line 56 is connected. FIG. 11B is a side cross-sectional view schematically illustrating a state where the display 16 is attached and fixed to the inner surface sides of the chassis members 12A and 12B from the state illustrated in FIG. 11A. FIG. 11A and FIG. 11B illustrate the states omitting the attachment piece 38, the attachment portion 40, and the like.

As illustrated in FIG. 10 and FIG. 11A, the wiring lines crossing the backbone portion 14, such as the main wiring line 56, the battery wiring line 58, and the wiring line 60, are connected first. For example, the main wiring line 56 is connected with the sub-substrate 24 through a connector 56a, and the connector 56a is firmly fixed to the sub-substrate 24 using a screw 64. Furthermore, the sub-wiring line 62 is connected between the sub-substrate 24 and the one end portion 16b of the display 16, and then the display 16 is disposed outside the second chassis member 12B in the reversed state through the sub-wiring line 62. The sub-wiring line 62 may be connected before connecting the main wiring line 56 and the like. Therefore, the main wiring line 56 and the like can be wired and connected preventing the display 16 from being an obstacle.

Herein, the main wiring line 56 and the like crossing the backbone portion 14 are certainly disposed or fixed at positions where the main wiring line 56 and the like can cope with a folding operation of the chassis members 12A and 12B. This can avoid the application of an unintended load or the occurrence of bending in the wiring lines crossing the backbone portion 14, such as the main wiring line 56, in an opening/closing operation of the chassis members 12A and 12B. Herein, the inner surfaces of the chassis members 12A and 12B are not covered with the display 16, and therefore the main wiring line 56 and the like crossing the backbone portion 14 can be easily and certainly wired at desired designed positions.

Subsequently, as illustrated in FIG. 11B, the sub-wiring line 62 is turned back, and the display 16 is disposed on the inner surface sides of the chassis members 12A and 12B. Thus, the one end portion 16b of the display 16 is disposed on the outer end surface 12Bb side of the second chassis member 12B, and another end portion 16c on the opposite side in the longitudinal direction is disposed on the outer end surface 12Ab side of the first chassis member 12A. Then, as illustrated in FIG. 3, the support plate 18 is fixed to the inner surface sides of the chassis members 12A and 12B through the attachment pieces 38 and the attachment portions 40, and then the bezel member 27 is attached. Thus, the wiring of the portable information device 10 and the attachment and fixation of the display 16 are completed. The sub-wiring line 62 does not cross the backbone portion 14. Therefore, even when a positional shift occurs when disposing the display 16 on the inner surface sides of the chassis members 12A and 12B, no problems occur.

5. Description of Ground Structure

The ground structure of the portable information device 10 is described. The portable information device 10 adopts the configuration in which the portable information device 10 is foldable into a double-folded state. Therefore, the electronic components are disposed as appropriate on the chassis members 12A and 12B on the right side and the left side, and the display 16 is provided over the chassis members 12A and 12B on the right side and the left side. In particular, when a self-light emitting element, such as organic electroluminescence, is used for the display 16, a relatively large current gradient is generated from an anode side on one end side of the display 16 toward a cathode side on the other end side thereof. Therefore, it is desired to build an appropriate frame ground between the chassis members 12A and 12B of this folding structure.

Figure 12A:
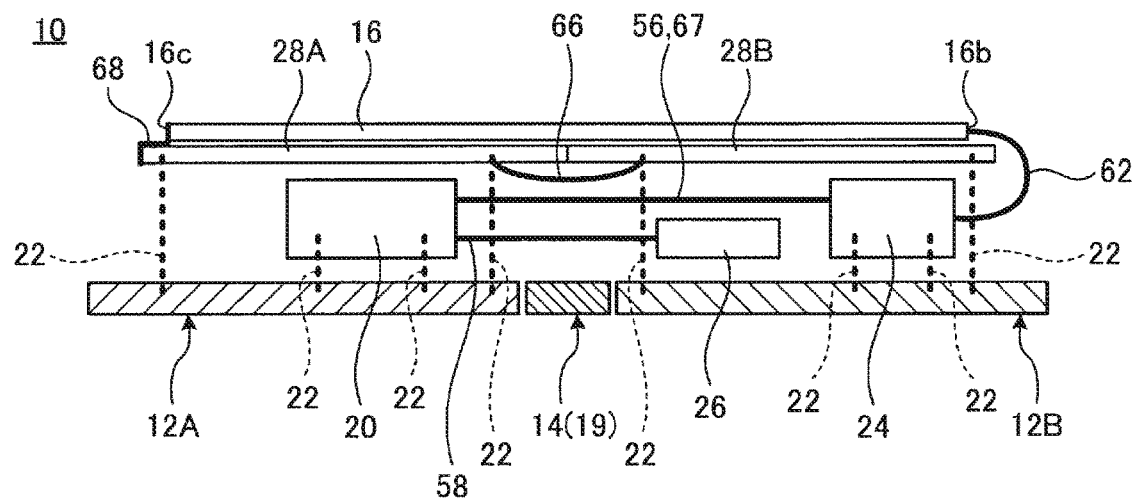
FIG. 12A is a side view schematically illustrating the main ground structure of the portable information device.
Figure 12B:
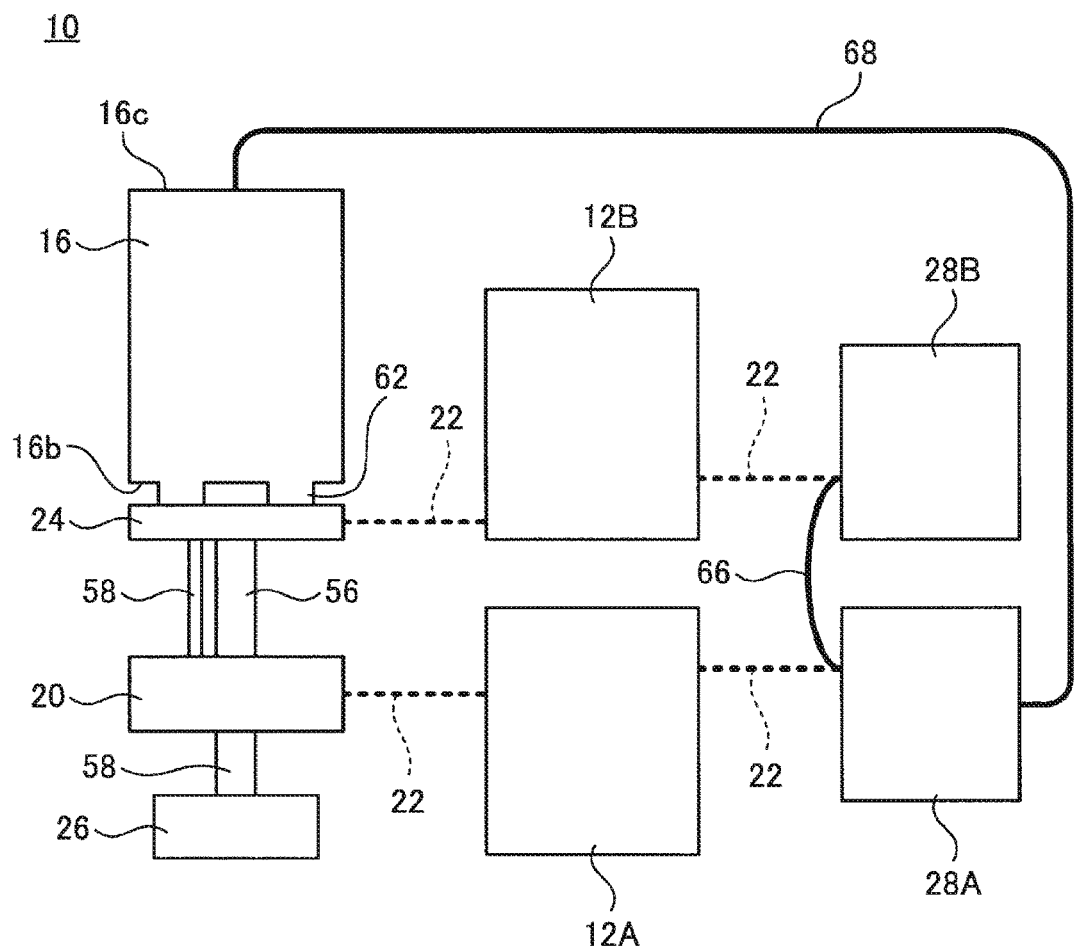
FIG. 12B is a block diagram schematically illustrating the main ground structure of the portable information device.

FIG. 12A is a side view schematically illustrating the main ground structure of the portable information device 10. FIG. 12B is a block diagram schematically illustrating the main ground structure of the portable information device 10. In FIG. 12A and FIG. 12B, the elements, such as the sheet-like member 30 of the support plate 18, are omitted.

In the case of this embodiment, the chassis members 12A and 12B and the plate members 28A and 28B are formed of a conductor. As illustrated in FIG. 12A and FIG. 12B, the main substrate 20 and the first plate member 28A each are attached and fixed to the first chassis member 12A using the conductive screws 22 (see also FIG. 3). The sub-substrate 24 and the second plate member 28B each are attached and fixed to the second chassis member 12B using the conductive screws 22 (see also FIG. 3). As a result, the main substrate 20 and the first chassis member 12A are electrically connected, and the first plate member 28A and the first chassis member 12A are electrically connected. The sub-substrate 24 and the second chassis member 12B are electrically connected, and the second plate member 28B and the second chassis member 12B are electrically connected.

Then, between an engagement portion of the conductive screw 22 to the first chassis member 12A of the first plate member 28A and an engagement portion of the conductive screw 22 to the second chassis member 12B of the second plate member 28B, a ground wiring line (first conductive member) 66 crossing the backbone portion 14 is connected by co-fastening by the conductive screws 22 (see also FIG. 4). Thus, the first plate member 28A and the second plate member 28B are electrically connected. As a result, the first chassis member 12A and the second chassis member 12B are also electrically connected.

Next, as illustrated in FIG. 12A and FIG. 12B, the main substrate 20 on the first chassis member 12A side and the sub-substrate 24 on the second chassis member 12B side are electrically connected with the main wiring line 56 and a return path 67 crossing the backbone portion 14. On the second chassis member 12B side, the sub-substrate 24 and the one end portion 16b of the display 16 are electrically connected by the sub-wiring line 62. As a result, the one end portion 16b of the display 16 and the chassis members 12A and 12B are electrically connected. Therefore, in the display 16, the one end portion 16b side in the longitudinal direction serves as the anode side, and the other end portion 16c side thereof serves as the cathode side, and an electrical resistance value therebetween increases to generate a current gradient from the one end portion 16b to the other end portion 16c.

Figure 13:
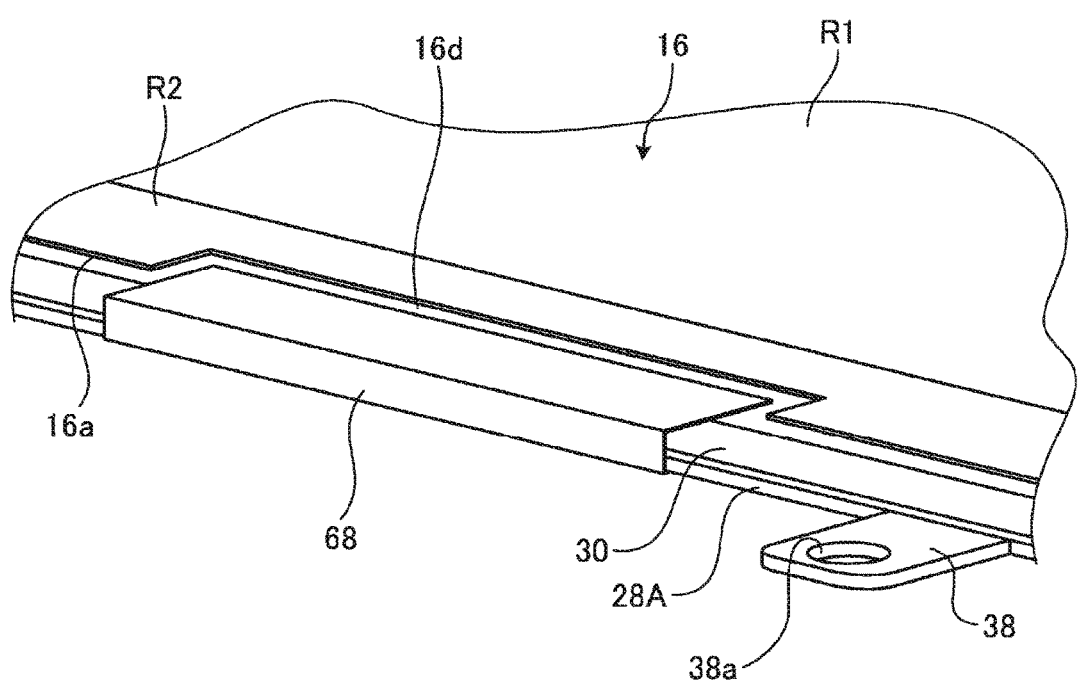
FIG. 13 is an enlarged perspective view of a principal portion illustrating a state where the display and a first plate member are connected with a ground tape.

Then, in the portable information device 10, the other end portion 16c of the display 16 and the first plate member 28A are connected with a ground tape (second conductive member) 68 on the second chassis member 12B side. The ground tape 68 is an adhesive tape having conductivity. As illustrated in FIG. 13, the ground tape 68 is pasted and fixed through the end surface of the support plate 18 so as to connect a conductive pad portion 16d exposed to the other end portion 16c of the display 16 and the first plate member 28A. A common ground wiring line may be used in place of the ground tape 68. Thus, the other end portion 16c of the display 16 and the first plate members 28A are electrically connected. Therefore, the other end portion 16c of the display 16 and the chassis members 12A and 12B are also electrically connected. As a result, the ground level between the one end portion 16b and the other end portion 16c in the longitudinal direction serving as the current driving direction of the display 16 is fixed. Thus, the ground structure in the portable information device 10 is built and a measure against a noise (EMC) is also achieved.

6. Description of Operational Effects of Portable Information Device

As described above, the portable information device 10 according to this embodiment has the support plate 18 which is fixed to the inner surface sides of the first chassis member 12A and the second chassis member 12B and supports the rear surface 16a of the display 16. The support plate 18 has the first plate member 28A disposed on the inner surface side of the first chassis member 12A, the second plate member 28B disposed on the inner surface side of the second chassis member 12B, and the sheet-like member 30 connecting the first plate member 28A and the second plate member 28B so as to be foldable into a double-folded state.

Thus, the portable information device 10 supports the rear surface 16a of the display 16 which is a foldable flexible display with the foldable support plate 18. Therefore, the display 16 can be stably supported by the support plate 18 on the inner surface sides of the chassis members 12A and 12B. As a result, impact or a load to the display 16 can be received by the support plate 18, so that the generation of a defect of the display 16 can be prevented.

The sheet-like member 30 is provided on the entire surfaces 18a of the first plate member 28A and the second plate member 28B, and the display 16 is fixed to the surface thereof. Therefore, a uniform plane can be formed by the sheet-like member 30 provided on the entire surface of the support plate 18 having the two plate members 28A and 28B connected with each other. Thus, the display 16 can be further stably supported and the generation of a defect can be further certainly prevented.

Between the inner end surface 28Aa which is one end surface of the first plate member 28A and the inner end surface 28Ba which is one end surface of the second plate member 28B facing the inner end surface 28Aa, a gap is formed in the state where the first chassis member 12A and the second chassis member 12B are folded into a double-folded state (see FIG. 5B). On the other hand, no gap is formed in the state where the first chassis member 12A and the second chassis member 12B are opened into a flat plate shape (see FIG. 5A). Thus, when the portable information device 10 is in the usage form, not only the flexible sheet-like member 30 but the hard plate members 28A and 28B are disposed at a portion corresponding to the bending portion 32 of the display 16. As a result, the impact resistance of the display 16 can be prevented from lowering in the portion corresponding to the bending portion 32, so that high impact resistance can be secured in the entire region.

In the portable information device 10, a fiber reinforced resin plate, particularly a carbon fiber reinforced resin plate, is used for the first plate member 28A and the second plate member 28B, and metallic foil, particularly a stainless steel sheet, is used for the sheet-like member 30. In the support plate 18 containing this combination, higher effects are obtained in the impact absorbability, the bending durability, the surface flatness, and the like. The thickness of the stainless steel sheet forming the sheet-like member 30 varies depending on the type of the stainless material, the bending curvature, and the like, and is preferably about 40 μm, for example.

The plate members 28A and 28B have the attachment pieces 38 projecting outwardly from a part of the outer peripheral end surfaces thereof and are fixed to the chassis members 12A and 12B through the attachment pieces 38. Thus, the support plate 18 supporting the display 16 is attached and fixed with the cushion structure like a trampoline on the inner surface sides of the chassis members 12A and 12B. As a result, the impact resistance of the display 16 is improved. The attachment pieces 38 may be provided only in either the plate member 28A or 28B.

Such an attachment piece 38 projects outwardly from the outer peripheral end surfaces of the plate members 28A and 28B. Therefore, the engagement portions to the chassis members 12A and 12B of the attachment pieces 38 serving as hard supporting points can be separated as soon as possible from the display region R1 of the display 16, so that impact to the display region R1 can be effectively reduced.

However, the display region R1 of the display 16 is not necessarily disposed on the center of the outside of the display 16 as illustrated in FIG. 3. More specifically, in the display 16, the sub-wiring line 62 is connected with the one end surface (one end portion 16b) side in the longitudinal direction, for example (see FIG. 12A), and therefore the wiring lines from the elements forming the display region R1 to the sub-wiring line 62 gather on the one end portion 16b side. Then, in the case of this embodiment, the non-displaying region R2 on the one end portion 16b side of the display 16 is configured so as to be broader than the non-displaying region R2 on the other end portion 16c side (see FIG. 3). On the other hand, it is desirable that the display region R1 of the display 16 is disposed on the center of the outer shape with respect to the chassis members 12A and 12B brought into the usage form. Then, in the case of this embodiment, the gap between the one end portion 16b of the display 16 and the outer wall (outer end surface 12Bb) of the second chassis member 12B is set so as to be narrower than the gap between the other end portion 16c and the outer wall (outer end surface 12Ab) of the first chassis member 12A, so that the display region R1 is set at the center of the chassis members 12A and 12B.

For such reasons, the support plate 18 supporting the entire region of the rear surface 16a of the display 16 is structured so as to hardly project the attachment pieces 38 from the end surface supporting the one end portion 16b of the display 16. Then, in the portable information device 10, the attachment portion 40 configured so as not to project outwardly is used for the outer peripheral edge portion of the second plate member 28B corresponding to the one end portion 16b of the display 16. As a result, the portable information device 10 can achieve both the suppression of the enlargement of the chassis structure and the certain support of the display 16 by the support plate 18.

It is a matter of course that the present invention is not limited to the embodiments described above and can be freely altered without deviating from the scope of the present invention.

We claim:

1. A portable information device comprising:
a first chassis member;
a second chassis member foldably connected with the first chassis member;
a display over inner surfaces of the first chassis member and the second chassis member, and which is foldable into a double-folded state; and
a support plate fixed to inner surface sides of the first chassis member and the second chassis member and supports a rear surface of the display;
wherein the support plate has a first plate member on the inner surface side of the first chassis member, a second plate member on the inner surface side of the second chassis member, and a flexible sheet-like member connecting the first plate member and the second plate member so as to be foldable into a double-folded state;

wherein the flexible sheet-like member is on entire surfaces of the first plate member and the second plate member, and the display is fixed to a surface of the flexible sheet-like member.

2. The portable information device according to claim 1, wherein:
a gap is formed between one end surface of the first plate member and one end surface of the second plate member facing the one end surface of the first plate member in a state where the first chassis member and the second chassis member are folded into a double-folded state, and
a gap is not formed in a state where the first chassis member and the second chassis member are opened into a flat plate shape.

3. The portable information device according to claim 1, wherein:
the first plate member and the second plate member are formed of a fiber reinforced resin plate, and
the flexible sheet-like member is formed of metallic foil.

4. The portable information device according to claim 1, wherein:
at least one of the first plate member and the second plate member has an attachment piece projecting outwardly from a part of an outer peripheral end surface thereof, and is fixed to the first chassis member or the second chassis member through the attachment piece.

5. The portable information device according to claim 1, wherein:
at least one of the first plate member and the second plate member has an attachment portion projecting from a rear surface of an outer peripheral edge portion of the at least one of the first plate member and the second plate member, and is fixed to the first chassis member or the second chassis member through the attachment portion.

6. The portable information device according to claim 1, wherein:
a cushion member is placed between a rear surface of the support plate and the inner surface of at least one of the first chassis member and the second chassis member.

7. The portable information device according to claim 1, wherein:
a damping member is on a rear surface side of the support plate.

8. The portable information device according to claim 1, wherein:
a main substrate on which an arithmetic unit is mounted is on the inner surface of the first chassis member, a sub-substrate controlling a display state of the display is on the inner surface of the second chassis member, the main substrate and the sub-substrate are electrically connected by a main wiring line crossing the first chassis member and the second chassis member, and the display is electrically connected with the sub-substrate by a sub-wiring line drawn out from a portion located on the inner surface side of the second chassis member.

9. The portable information device according to claim 1, wherein:
the first chassis member and the second chassis member are electrically connected,
one end portion of the display and the second chassis member are electrically connected, and
another end portion opposite to the one end portion of the display and the first chassis member are electrically connected.

10. The portable information device according to claim 9, wherein:
the first chassis member is electrically connected with the first plate member, the second chassis member is electrically connected with the second plate member, and
the portable information device has:
a first conductive member electrically connecting the first chassis member and the second chassis member by electrically connecting the first plate member and the second plate member and
a second conductive member electrically connecting the other end portion of the display and the first chassis member by electrically connecting the other end portion of the display and the first plate member.

11. A portable information device comprising:
a first chassis member;
a second chassis member foldably connected with the first chassis member;
a display over inner surfaces of the first chassis member and the second chassis member, and which is foldable into a double-folded state;
a main substrate on which an arithmetic unit is mounted is on the inner surface of the first chassis member;
a sub-substrate controlling a display state of the display is on the inner surface of the second chassis member, wherein:
the main substrate and the sub-substrate are electrically connected by a main wiring line crossing the first chassis member and the second chassis member, and the display is electrically connected with the sub-substrate by a sub-wiring line drawn out from a portion located on an inner surface side of the second chassis member; and
a support plate has a first plate member on the inner surface side of the first chassis member, a second plate member on the inner surface side of the second chassis member, and a flexible sheet-like member connecting the first plate member and the second plate member so as to be foldable into a double-folded state;
wherein the flexible sheet-like member is on entire surfaces of the first plate member and the second plate member, and the display is fixed to a surface of the flexible sheet-like member.

12. A portable information device comprising:
a first chassis member;
a second chassis member foldably connected with the first chassis member;
a rectangular display over inner surfaces of the first chassis member and the second chassis member, and which is foldable into a double-folded state, wherein:
the first chassis member and the second chassis member are electrically connected,
one end portion of the display and the second chassis member are electrically connected,
another end portion opposite to the one end portion of the display is electrically connected with the first chassis member; and
a support plate has a first plate member on the inner surface side of the first chassis member, a second plate member on the inner surface side of the second chassis member, and a flexible sheet-like member connecting the first plate member and the second plate member so as to be foldable into a double-folded state;
wherein the flexible sheet-like member is on entire surfaces of the first plate member and the second plate member, and the display is fixed to a surface of the flexible sheet-like member.

* * * * *